July 27, 1965  E. E. MONK  3,196,909
COMMUNION GLASS FILLER
Filed March 21, 1963  3 Sheets-Sheet 1
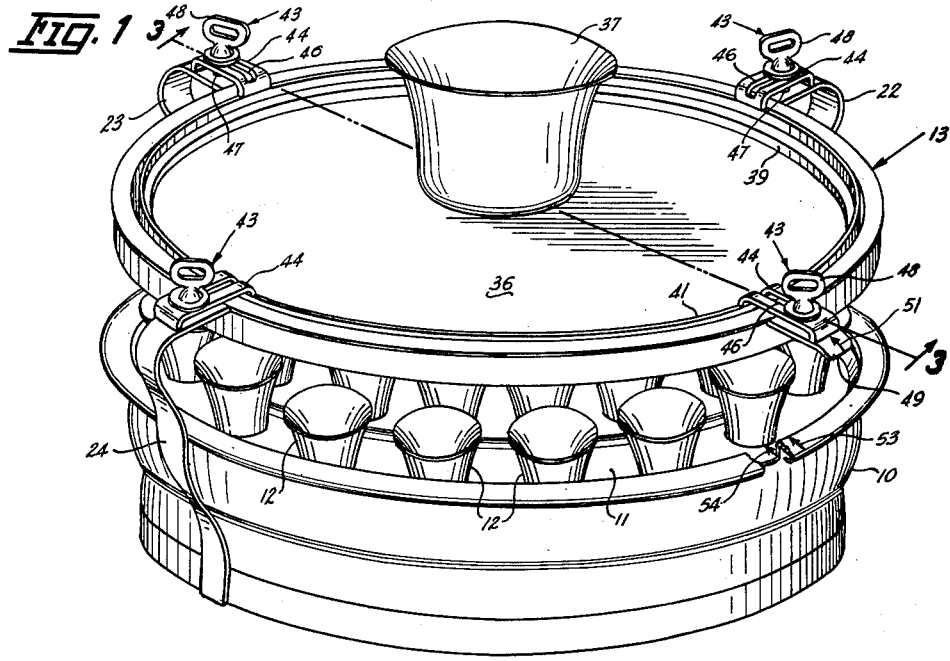
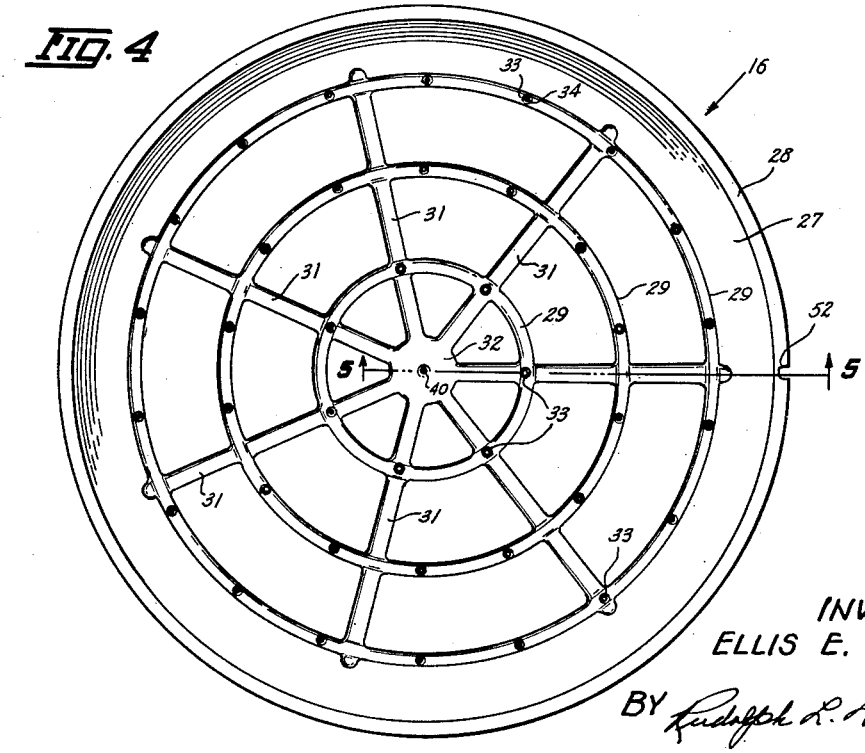
INVENTOR.
ELLIS E. MONK
BY *Rudolph L. Lowell*
ATTORNEY.

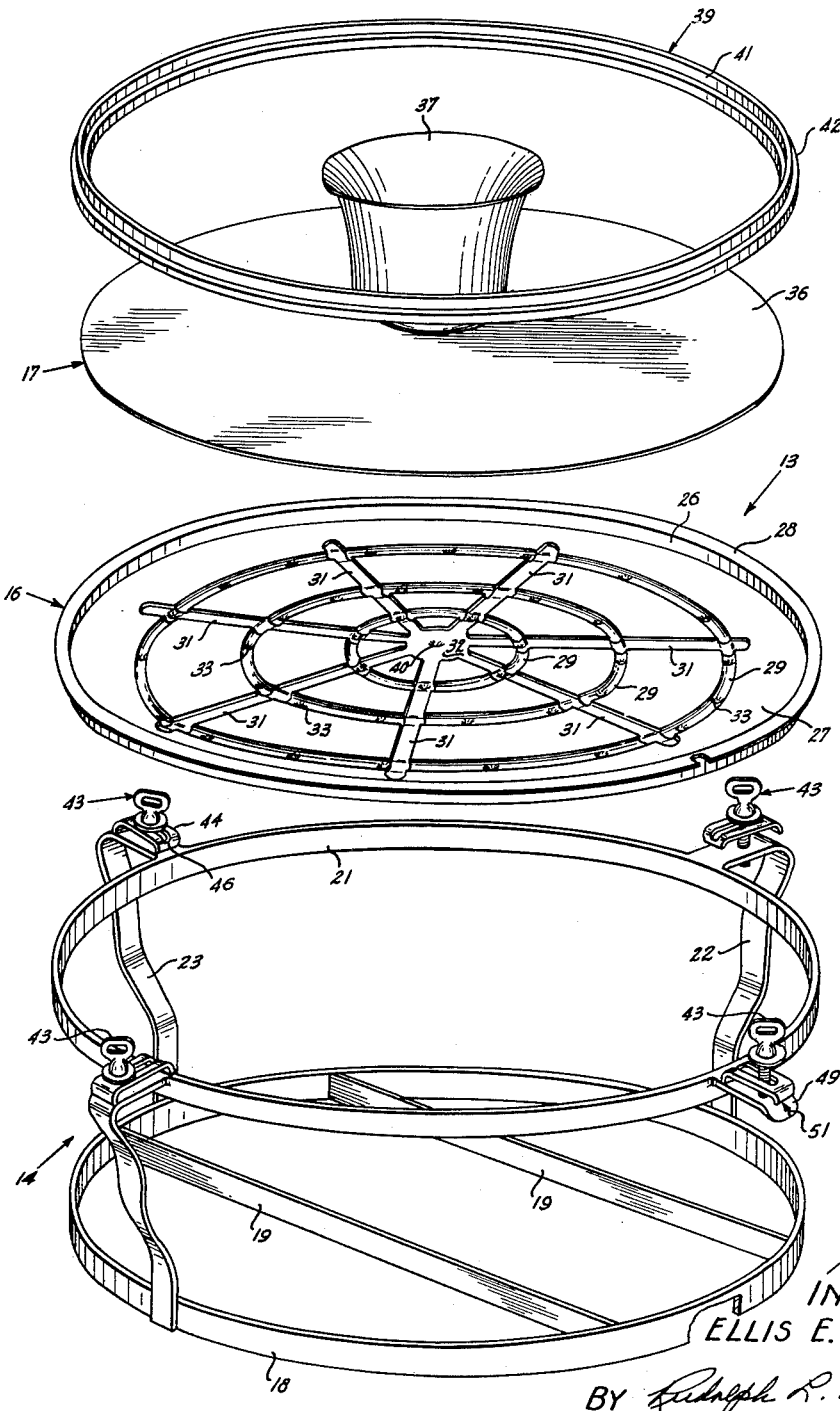

July 27, 1965  E. E. MONK  3,196,909
COMMUNION GLASS FILLER
Filed March 21, 1963  3 Sheets-Sheet 3

INVENTOR.
ELLIS E. MONK
BY *Rudolph L. Lowell*
ATTORNEY.

United States Patent Office
3,196,909
Patented July 27, 1965

3,196,909
COMMUNION GLASS FILLER
Ellis E. Monk, 2540 E. University, Des Moines, Iowa
Filed Mar. 21, 1963, Ser. No. 267,029
6 Claims. (Cl. 141—237)

This invention relates to a liquid dispensing apparatus and more particularly to a communion glass filler adapted to disseminate liquid from a supply funnel simultaneously to a plurality of communion glasses positioned on a serving tray.

It is the object of the invention to provide an improved communion glass filler which uniformly and simultaneously distributes a substantially equal volume of liquid to a plurality of communion glasses held in a tray which is positioned under the filler.

Another object of the invention is to provide for use with a tray holding a plurality of liquid receptacles, a liquid dispensing apparatus which simultaneously and rapidly apportions a substantially equal volume of liquid to all of the receptacles in the tray.

A further object of the invention is to provide a communion glass filler which is easily and quickly disassembled for cleaning purposes.

Still another object of the invention is to provide a communion glass filler for simultaneously supplying a liquid to a plurality of glasses positioned in a tray and which glass filler is constructed to receive the tray and empty glasses therein and permits uninhibited separation of the tray and filled glasses therefrom.

An additional object of the invention is to provide a portable and economical communion glass filler which is reliable and efficient in use and does not spill the rationed liquid.

These and other objects and advantages of this invention will become readily apparent upon reference to the following description relating to the annexed drawing, wherein:

FIG. 1 is a perspective view of the communion glass filler of the invention in assembled relation with a plurality of glasses held in a tray;

FIG. 2 is an exploded view of the communion glass filler of FIG. 1;

FIG. 4 is a plan view of the liquid distributing pan of the communion glass filler of FIG. 1;

Figure 3:
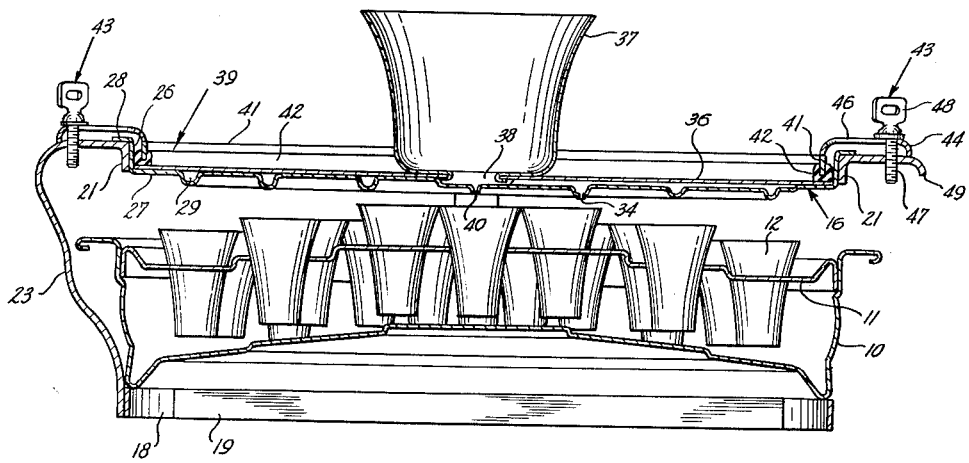
FIG. 3 is a sectional view taken along the line 3—3 of FIG. 1.

Referring to the drawing, there is shown in FIG. 1 a circular communion glass tray 10 containing a glass supporting plate 11. A pluraltiy of small tapered glasses 12 are positioned in circumferentially spaced openings in the plate 11. The glasses 12 are arranged in three concentric rows with the center of the plate 11 containing an additional glass. The tray 10 containing the glasses is positioned under a liquid dispensing apparatus, indicated by the numeral 13 and illustrated as a communion glass filler. The dispensing apparatus simultaneously and rapidly apportions liquid supplied thereto in substantially equal volumes to all of the glasses 12 positioned in the tray.

As shown in FIG. 2, the filler 13 comprises a frame 14 for supporting a liquid distributing pan 16 and cover 17 therefor above its supporting surface. The frame 14 includes a base ring 18 having a diameter substantially equal to the diameter of the bottom wall of the tray 10. A pair of parallel bars 19 fastened at each end to the inner peripheral wall of the base ring function to reinforce the ring and to provide support for the tray 10 when it is moved into and out from under the pan 16. A top ring 21 having a diameter slightly larger than the base ring 18 is positioned concentrically of and above the base ring 18 by means of circumferentially spaced legs 22, 23 and 24. Each of the legs is secured to the base ring 18 and extends upwardly and outwardly therefrom with the top section turned inwardly and secured to the top ring 21. The legs 22 and 24 are diametrically opposed with the leg 23 positioned circumferentially between the legs 22 and 24 thereby leaving an open side between the base ring 18 and the top ring 21 which allows the uninhibited movement of the tray 10 into and from the frame 14.

The fluid distributing pan 16 has an upwardly extended circular peripheral wall 26 and a substantially flat base wall 27. The top edge of the peripheral wall 26 is turned outwardly to form a lip 28. As shown in FIG. 3, the pan 16 has a diameter slightly less than the internal diameter of the top ring 21 so that the peripheral wall 26 nests within the top ring 21 and the lip 28 rests on the top ring thereby positioning the liquid distributing pan above the tray 10.

As shown in FIGS. 2 and 4, the base wall 27 of the pan 16 is formed with concentric circular grooves 29 which have a radius substantially equal to the mean radius of the concentric rows of glasses 12 positioned on the tray 10. A plurality of radially extended grooves 31 are circumferentially spaced around the base wall 27 and interconnect the circular grooves 29. The radial grooves 31 extend from the recessed center portion 32 of the base wall 27 outwardly toward the peripheral wall 26.

Formed in the trough of each of the concentric circular grooves 29 are circumferentially spaced pockets or recesses 33 each of which contains a hole in the bottom section thereof. The pockets 33 have a space relationship with respect to each other which coincides with the space relationship of the glasses 12 of the tray 10.

Figure 5:
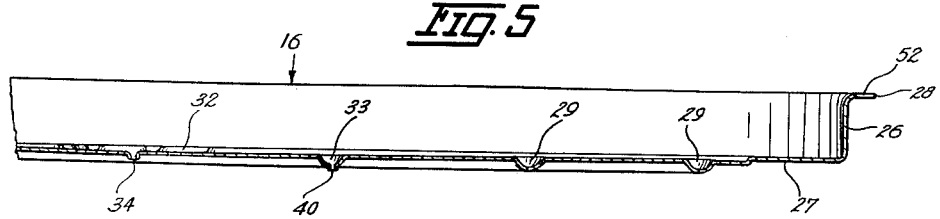
FIG. 5 is an enlarged sectional view taken along line 5—5 of FIG. 4.
Figure 6:
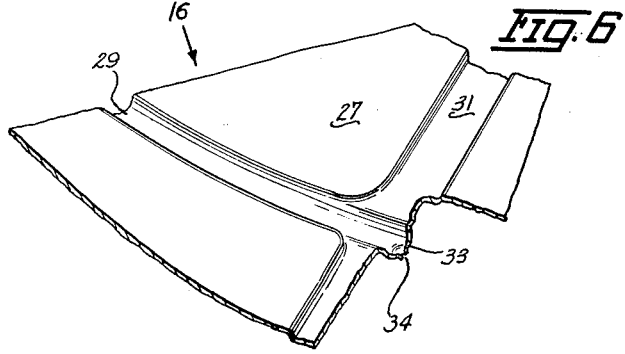
FIG. 6 is an enlarged fragmentary perspective view of a part of the liquid distributing pan showing the grooves forming a channel for the liquid and a pocket having a drain hole for directing the liquid from the pan.

As shown in FIGS. 5 and 6, the pockets 33 have a semispherical concave shape with a continuously sloping surface which forms the side walls for the hole 34 thereby overcoming the holding effect caused by the surface tension of the liquid and permitting the fluid to freely flow through the hole. The circular grooves 29 have a greater depth than the radial grooves 31 so that the fluid will readily flow therein.

The cover 17, shown in FIG. 2, is a flat disc 36 which has a diameter slightly less than the internal diameter of the pan 16. Secured to the center section of the circular disc 36 is a bell-shaped funnel 37 having a bottom hole 38 in registration with a corresponding opening 40 formed in the disc 36 (FIG. 3). When the circular disc 36 is assembled in the pan 16 the disc is in engagement with the flat wall 27 and confines the fluid to the circular and radial grooves 29 and 31 respectively. The peripheral edge of the circular disc 36 is maintained in a sealing relation with the peripheral wall 26 of the pan 16 by means of an annular seal 39 which comprises a circular ring 41 and an annular resilient gasket 42 having a U-shaped cross section. The annular gasket 42 is positioned over the bottom edge of the circular ring 41.

In the assembled position of the liquid dispensing apparatus 13, shown in FIGS. 1 and 3, the annular seal 39 is held in bearing engagement with the peripheral section of the disc 36 and the peripheral side wall 26 of the pan 16 by means of a plurality of circumferentially spaced clamps 43. As shown in FIG. 1, there are two pairs of diametrically opposed clamps 43 each of which includes a channel-shaped slide 44 having a longitudinal extended slot 46. A bolt 47 having a wing-shaped head 48 extends through the slot 46 of each slide 44 and is threaded into the top inward extended portion of the legs 22, 23 and 24. The clamp 43 opposite the leg 23 is retained on an outwardly extended arm 49 secured to the top ring 21 and extended radially outward therefrom.

When the clamps 43 are in a locked position the slide 44 engages the top of the circular ring 41 of the seal 39 and is pivoted on the top of the respective legs 22, 23 and 24 and arm 49. When the bolts 47 are turned down the slides 44 act as levers to force the annular seal 39 down into the pan 16 thereby holding the pan on the top ring 21 of the frame and concurrently holding the disc 36 of the cover 17 in a stacked relationship with respect to the base wall 27 of the pan 16.

In order to insure the registration of the glasses with the holes in the pan 16, the frame 14 is provided with an indicator 51 which is to be aligned with a notch 52 in the pan 16 thereby indexing the liquid distributing pan 16 on the frame 14. The tray 10 and glass support 11 have position or indicating marks 53 and 54, respectively, which are aligned to locate the position of the glasses with respect to the tray 10. The mark 53 on the tray 10 is aligned with the indicator 51 on the frame to coordinate the relationship between the liquid dispensing holes in the pan 16 with the position of the glasses on the tray 10.

In the assembly of the liquid dispensing apparatus the clamps 43 are released and the slides 44 thereof are moved to a radially outward position. The liquid distributing pan 16 is placed on the top ring 21 of the frame with the annular lip 28 thereof in engagement with the top of the ring 21. The notch 52 in the lip 28 is aligned with the indicator 51 shown as an arrow on the arm 49. After the cover 17 and annular seal 39 have been nested within the pan 16, the slides 44 of the respective clamps 43 are moved to their radial "in" position and engage the top of the circular ring of the annular seal 39. Bolts 47 are turned down to clamp the pan 16 on the frame 14 and effect a seal between the peripheral section of the cover 17 and the peripheral wall of the pan 16. The liquid dispensing apparatus 13 is now assembled and for simultaneously allocating a substantially equal volume of liquid to all of the glasses in the tray 10.

In use, the tray 10 containing empty and clean glasses is placed between the base and top rings 18 and 21 respectively of the frame with the mark 53 in alignment with the indicator on the arm 49. In this position the glasses 12 supported on the tray are in substantial alignment with the pockets 33 and holes 34 therein. A measured amount of liquid, such as wine, determined by the summation of the volume of liquid to be placed in each of the glasses 12 in the tray, is placed in the funnel 37. From the funnel 37 the liquid flows through the hole 38 into the recess 32 and radially outward along the radial grooves 31. From the radial grooves the liquid flows laterally into the circular grooves 29 displacing the air therein which moves through the holes 34 in the pockets 33. The liquid flows toward the pockets 33 as they extend below the bottom wall of the circular grooves 29. The liquid flows freely through the holes 34 in each of the pockets because the walls forming the pockets are relatively smooth and curve in a downward direction. The flow of fluid through the radial and circular grooves is continuous as the fluid in the funnel 37 establishes a slight static head which places the fluid in the respective grooves under a small pressure thereby insuring a rapid and substantially uniform flow of fluid through each of the holes 34 in the respective pockets 33.

All of the liquid in the funnel 37 will be disseminated into the respective glasses because the circular grooves 29 are of a greater depth than the radial grooves 31 and the pockets 33 in their respective circular grooves 39 have a greater depth than the circular grooves. Thus the lowest points in the gravitational feed system of the liquid dispensing apparatus are the pockets 33 which contain holes 34 shaped to permit fluid to flow through the base wall 27 in the pan 16.

After the tray 10, with the filled glasses 12, has been removed from the liquid dispensing apparatus 13 a second tray containing empty glasses may be inserted within the frame 14 with the position mark 53 in alignment with the indicator 51. The glasses in the second tray may now be simultaneously filled with liquid as hereinbefore described.

While there have been shown, described, and pointed out the fundamental novel features of the invention as applied to a preferred embodiment, it is to be understood that various omissions, substitutions, changes in form, and details of the apparatus illustrated may be made by those skilled in the art, without departing from the spirit of the invention which is intended to be limited only as indicated by the scope of the following claims.

I claim:
1. An apparatus for simultaneously distributing a substantially equal volume of liquid to a plurality of liquid receptacles positioned on a tray comprising:
   (a) frame means adapted to be positioned over said tray with the receptacles thereon,
   (b) a liquid distributing pan supported on said frame means above the receptacles positioned on the tray, said pan having an upwardly extended peripheral side wall and a flat bottom wall formed with a plurality of concentric grooves and radial grooves connected with the concentric grooves,
   (c) means in said concentric grooves defining separate semi-spherical concave pockets each of which has a hole disposed vertically above a corresponding receptacle,
   (d) cover means within said pan in engagement with said bottom wall thereof, said cover means confining the liquid to said radial and concentric grooves,
   (e) funnel means mounted on the center section of the cover means and having a hole in the bottom wall thereof in liquid registration with the inner ends of said radial grooves to provide for the flow of liquid into the pan,
   (f) annular seal means positioned within said pan over said cover means for sealing the peripheral edge of the cover means with the side wall of the pan, and
   (g) clamp means mounted on said frame means and engageable with said annular seal means for holding said pan and cover means on said frame means.
2. An apparatus for simultaneosuly distributing a substantially equal volume of liquid to a plurality of liquid receptacles positioned on a tray comprising:
   (a) frame means adapted to be positioned over said tray with the receptacles thereon,
   (b) a liquid distributing pan supported on said frame means above the receptacles positioned on the tray, said pan having an upwardly extended peripheral side wall and a bottom wall formed with a plurality of concentric grooves and radial grooves connecting the concentric grooves,
   (c) means in said concentric grooves defining separate pockets each of which has a hole disposed vertically above a corresponding receptacle,
   (d) indicator means on said frame means and pan adapted to be coordinated with marks on said tray to align the receptacles with the pockets in the pan whereby liquid flows from the pan into the receptacles,
   (e) cover means within said pan in engagement with said bottom wall thereof, said cover means confining the liquid to said radial and concentric grooves,
   (f) means mounted on the center section of the cover means and having a hole in the bottom wall thereof in liquid registration with the inner ends of said radial grooves to provide for the flow of liquid into the pan,
   (g) seal means positioned within said pan over said cover means for sealing the peripheral edge of the cover means with the side wall of the pan, and (h) means mounted on said frame means and engageable with said annular seal means for holding said pan means and cover means on said frame means.

3. An apparatus for simultaneously distributing a substantially equal volume of liquid to a plurality of liquid receptacles positioned on a tray comprising:

(a) frame means adapted to be positioned over said tray with the receptacles thereon, (b) a liquid distributing pan supported on said frame means above the receptacles positioned on the tray, said pan having a bottom wall formed with a plurality of connecting grooves, (c) means in said grooves defining separate pockets each of which has a hole disposed vertically above a corresponding receptacle, (d) cover means within said pan in engagement with said bottom wall thereof, said cover means confining the liquid to said grooves, (e) means mounted on the center section of the cover means and having a hole in alignment with at least a portion of said grooves to provide for the flow of liquid into the pan, (f) seal means positioned within said pan over said cover means for sealing the cover means with respect to said pan, and (g) means mounted on said frame means and engageable with said seal means for holding said pan and cover means on said frame means.

4. In an apparatus for distributing liquid to a plurality of liquid receptacles positioned on a tray, (a) a liquid distributing pan having an upwardly extended peripheral side wall and a bottom wall, said bottom wall having at least one circular groove and at least one radial groove opening into the circular groove whereby liquid flows from the radial groove to the circular groove, said circular groove having downwardly extended circular pockets having a hole in the bottom thereof, (b) cover means nested within said pan in engagement with said bottom wall for confining the liquid to said radial and concentric grooves, said cover means having a hole above the radial groove in the bottom wall of said pan thereby enabling liquid to be placed in said pan, (c) funnel means secured to said cover means in liquid communication with the hole therein whereby liquid placed in the funnel means flows into the radial and circular grooves in said pan, and (d) means for sealing the peripheral edge of the cover means with the side wall of said pan.

5. In an apparatus for distributing liquid to a plurality of liquid receptacles positioned on a tray, (a) a liquid distributing pan having a bottom wall, said bottom wall having at least one groove for receiving liquid, said groove having downwardly extended concave pockets having a hole in the bottom thereof, (b) cover means in engagement with said bottom wall for confining the liquid to said groove, said cover means having a hole above the groove in the bottom wall of said pan thereby enabling liquid to be placed in said pan, (c) means secured to said cover means in liquid communication with the hole therein whereby liquid placed in the means flows into the groove in said pan, and (d) means for sealing the cover means with said pan.

6. In an apparatus for distributing liquid to a plurality of liquid receptacles positioned on a tray, (a) a liquid distributing pan having an upwardly extended peripheral side wall and a bottom wall, said bottom wall having at least one circular groove and at least one radial groove opening into the circular groove whereby liquid flows from the radial groove to the circular groove, said circular groove having at least one downwardly extended concave pocket having a hole in the bottom thereof, and (b) cover means within said pan in engagement with said bottom wall for confining the liquid to said radial and concentric grooves, said cover means having a hole above the radial groove in the bottom wall of said pan thereby enabling liquid to be placed in said pan.

References Cited by the Examiner

UNITED STATES PATENTS

| 678,699 | 7/01 | Thomas | 141—239 |
|---|---|---|---|
| 981,469 | 1/11 | Peterson | 211—126 |
| 1,778,888 | 10/30 | Davis | 141—239 XR |
| 2,447,281 | 8/48 | Schneir | 141—237 |
| 2,820,490 | 1/58 | Hughes | 141—238 |
| 2,872,953 | 2/59 | Duncan | 141—237 |

FOREIGN PATENTS 273,355   4/14   Germany.

LAVERNE D. GEIGER, *Primary Examiner.*